(12) United States Patent
Yasuraoka et al.

(10) Patent No.: US 6,442,926 B2
(45) Date of Patent: *Sep. 3, 2002

(54) COMBINED CYCLE POWER GENERATION PLANT

(75) Inventors: Jun Yasuraoka; Kouzo Toyama, both of Takasago (JP)

(73) Assignee: Mitsubishi Heavy Industries, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 87 days.

(21) Appl. No.: 09/381,952
(22) PCT Filed: Jan. 29, 1998
(86) PCT No.: PCT/JP98/00352
§ 371 (c)(1), (2), (4) Date: Sep. 28, 1999
(87) PCT Pub. No.: WO99/39084
PCT Pub. Date: Aug. 5, 1999

(51) Int. Cl.$^7$ ................................................. F02C 6/00
(52) U.S. Cl. .................................................... 60/39.182
(58) Field of Search ........................................ 60/39.182

(56) References Cited

U.S. PATENT DOCUMENTS 3,953,966 A * 5/1976 Martz et al. ............... 60/39.02

FOREIGN PATENT DOCUMENTS

JP 5-163960 6/1993

OTHER PUBLICATIONS

Holman, J.P., "Experimental Methods for Engineers" McGraw–Hill Kogakusha 1966, pp. 201–202.*

* cited by examiner

Primary Examiner—Charles G. Freay
Assistant Examiner—Chud Gartenberg
(74) Attorney, Agent, or Firm—Oblon, Spivak, McClelland, Maier & Neustadt, P.C.

(57) ABSTRACT

A means detecting the flow of the steam at the gateway of the steam cooling system is provided, and the timing of the finish of the warm-up process of the steam cooling system at start-up is decided by the difference of the flow of the steam at the gateway. In case of the difference between the flow of the steam at the inlet and the flow of the steam at the outlet is below a permitted value, it is considered that residual air and drainage have been purged, the warming-up is finished, and the step for starting the gas turbine can be performed.

13 Claims, 2 Drawing Sheets

COMBINED CYCLE POWER GENERATION PLANT

FIELD OF THE INVENTION

The present invention relates to a combined cycle power plant composed of a gas turbine plant and a steam turbine plant.

BACKGROUND OF THE INVENTION

A combined cycle power plant is a power generating system which is composed of a gas turbine plant and a steam turbine plant. In this system, the gas turbine plant is operated so as to use a high temperature range of the thermal energy and the steam turbine plant is operated to use a low temperature range of the thermal energy, so that the thermal energy is efficiently recycled. Therefore, this power generating system is has attracted much interest recently.

In this combined cycle power plant, research and development of the plant are directed to raising the temperature of the high temperature area of the gas turbine, as one point for improving the efficiency.

Meanwhile, a cooling system is necessary for the high temperature area, in consideration of the heat resistance of the turbine structure, and air is conventionally used as the coolant of the cooling system.

However, in the case of using air as the coolant, even if a high temperature area is formed, this high temperature area does not produce improvements in the efficiency, because the amount of heat which is eliminated by the air which is used for cooling is increased. Therefore, there is a limit to the further improvements of the efficiency.

To overcome the above limit and to achieve further improvements of the efficiency, a cooling system using steam as the coolant instead of air has been proposed.

This type of cooling system is disclosed in Japanese Patent Application, First Publication, No. Hei 5-163960, for example. However, this cooling system has many problems which have to be overcome in its details, although it discloses the concept of using steam as the coolant.

For example, purging of the air which remains in the steam cooling system is necessary at the start of the gas turbine, and these processes are performed by the steam which is supplied by the auxiliary steam system in the above disclosed Japanese Patent Application.

However, there is no consideration of the drainage which is produced through the above series of process. Thus, the art of the steam cooling is still at the stage of trial and error, and the art for purging the drainage in the steam cooling system at the start of the gas turbine has no precedent.

Furthermore, in the conventional steam cooling system, the steam supplied by the auxiliary steam system is used for purging the air which remains in the cooling steam system, in the case of purging the air which remains in the system at the start of the gas turbine, as disclosed above. However, the oxygen concentration contained in water is increased by the air mixed with the steam at the supply of the steam for purging, and the oxygen may cause oxidation and corrosion of the pipes of the boiler.

Meantime, a drainage may be produced at the cooling portion of the gas turbine by the supply of the steam for purging. This drainage partly blocks a cooling pathway and the temperature of the metal parts of the cooling pathway shows unevenness, therefore, heat stress may be accelerated.

Moreover, if this partial blocking of the cooling pathway by the drainage is produced at a bladetip of a rotary portion or the like, moisture which is retained at the bladetip may promote the form of a super heated portion which is caused by a partial insufficiency of the cooling. Furthermore, the moisture may promote excessive centrifugal force by an unbalance of the mass, and this excessive centrifugal force may causes an accident.

The present invention is conceived in consideration of the above-described problems caused by the drainage, and has as its objective, the provision of a combined cycle power plant which can effectively purge the drainage and can certainly detects the exclusion of the drainage. In other words, the present invention has as its objective, the provision of a combined cycle power plant which can certainly detect the finishing of the warm-up process at the start of the gas turbine.

SUMMARY OF THE INVENTION

The present invention was achieved to overcome the above-stated problems.

A combined cycle power plant of the present invention is composed of a gas turbine plant and a steam turbine plant; and the combined cycle power plant has an exhaust heat recovery boiler for generating steam which drives the steam turbine using the exhaust heat from the gas turbine, and a steam cooling system for cooling high temperature cooled parts of the gas turbine by steam; and super heated steam from the steam cooling system is returned to the steam turbine. Furthermore, the combined cycle power plant has a means for detecting the flow of the steam at the gateway of the steam cooling system, and the timing of the finish of the warm-up process of the steam cooling system at the start is detected by the difference of the flow of the steam at the gateway. In case of a difference between the flow of the steam at the inlet and the flow of the steam at the outlet, of the steam cooling system, is below a permitted value, it is considered that residual air and drainage are not remained between the inlet and the outlet and the warming-up is finished, and running to the step for starting the gas turbine is enough.

Further, a combined cycle power plant of the present invention is composed of a gas turbine plant and a steam turbine plant; and the combined cycle power plant has an exhaust heat recovery boiler for generating steam which drives the steam turbine using the exhaust heat from the gas turbine, and a steam cooling system for cooling high temperature cooled parts of the gas turbine by steam; and super heated steam from the steam cooling system is returned to the steam turbine. Furthermore, the combined cycle power plant has a means for detecting the temperature of the steam at the outlet of the steam cooling system, and the timing of the finish of the warm-up process of the steam cooling system at the start is decided by the detected temperature of the steam at the outlet. For example, in case of the difference between the temperature of the steam at the outlet and the temperature of the steam at the inlet, of the steam cooling system, is below a permitted value, or the temperature of the steam at the outlet of the steam cooling system is over the saturated temperature at the supplied steam pressure, it is considered that residual air and drainage are not remained between the inlet and the outlet and warming-up is finished, and running to the step for starting the gas turbine is enough.

PREFERRED EMBODIMENTS OF THE INVENTION

Figure 1:
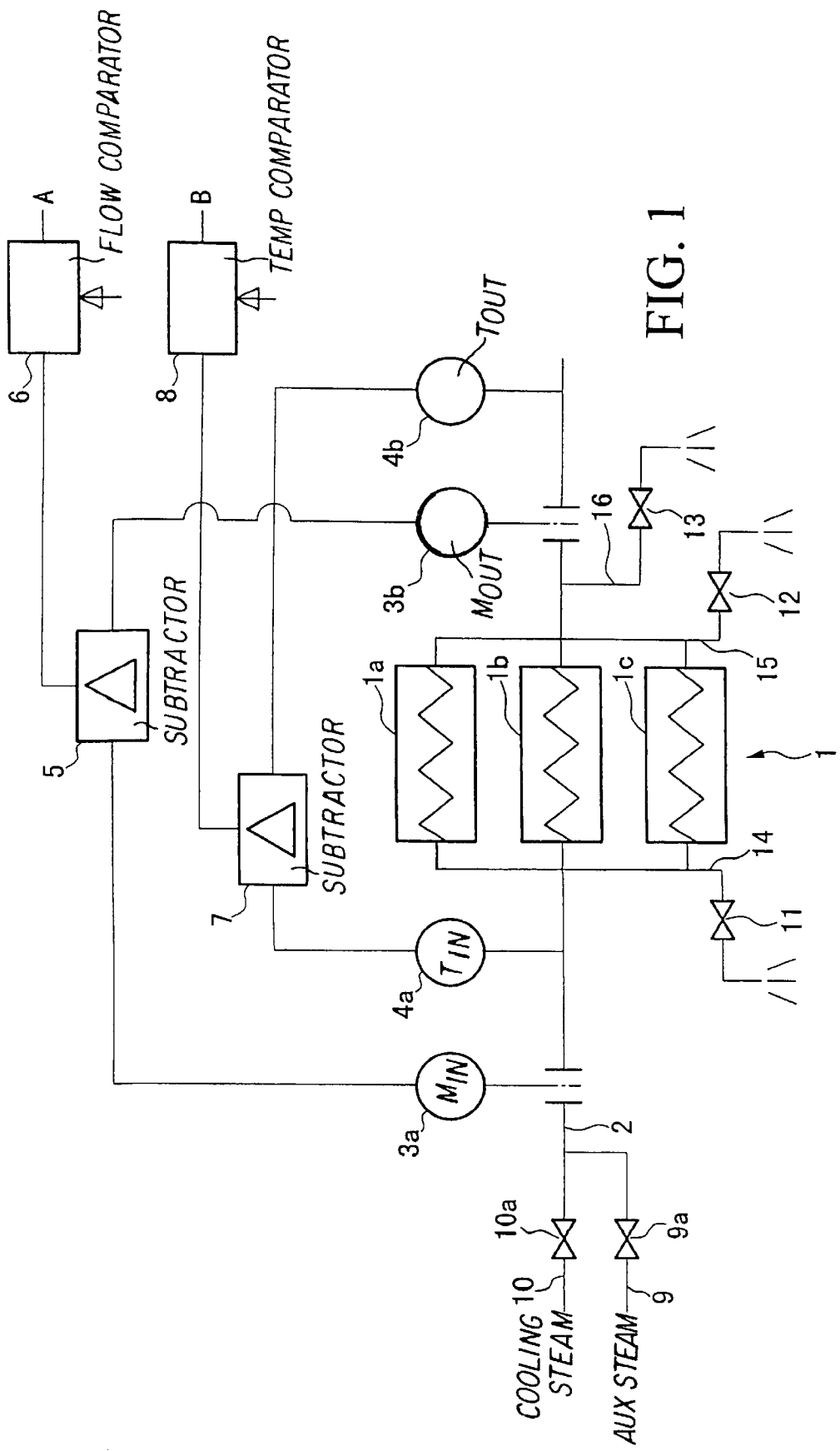
FIG. 1 is a schematic diagram for explaining the system for detecting the flow and temperature of the cooling steam at the gateway of the steam cooling system according to an embodiment of the present invention.

An embodiment of the present invention will be explained with FIG. 1 to FIG. 3.

Reference numeral 1 schematically shows a high temperature cooled parts of the gas turbine. For example, reference numeral 1a is a combustor, 1b is a moving blade, and 1c is a stationary blade.

Reference numeral 2 is a steam supply pipe, and an inlet flow-meter 3a is provided at the upper flow side of the pipe 2 which corresponds to the steam inflow side of the high temperature cooled parts 1. Furthermore, an outlet flow-meter 3b is provided at the downflow side of the pipe 2 which corresponds to the steam outflow side of the high temperature cooled parts 1.

Reference numeral 4a is an inlet thermometer and 4b is an outlet thermometer. These thermometers are provided at the inflow side or the outflow side of the high temperature cooled parts 1, similarly to the inlet flow-meter 3a and the outlet flow-meter 3b.

Reference numeral 5 is a first subtraction device. This device calculates the difference of the output between the inlet flow-meter 3a and the outlet flow-meter 3b, and sends this difference to a first comparison device 6. The first comparison device 6 compares the difference to a predetermined value. Similarly, Reference numeral 7 is a second subtraction device. This device calculates the difference of the output between the inlet thermometer 4a and the outlet thermometer 4b, and sends this difference to a second comparison device 8. The second comparison device 8 compares the difference to a predetermined value.

Reference numeral 9 is an auxiliary steam supply pipe which is connected to an auxiliary steam source (not shown), and 10 is a cooling steam supply pipe. These pipes are connected with the steam supply pipe 2 via switching valves 9a, 10a respectively. Furthermore, 11, 12, and 13 are drain valves.

Figure 2:
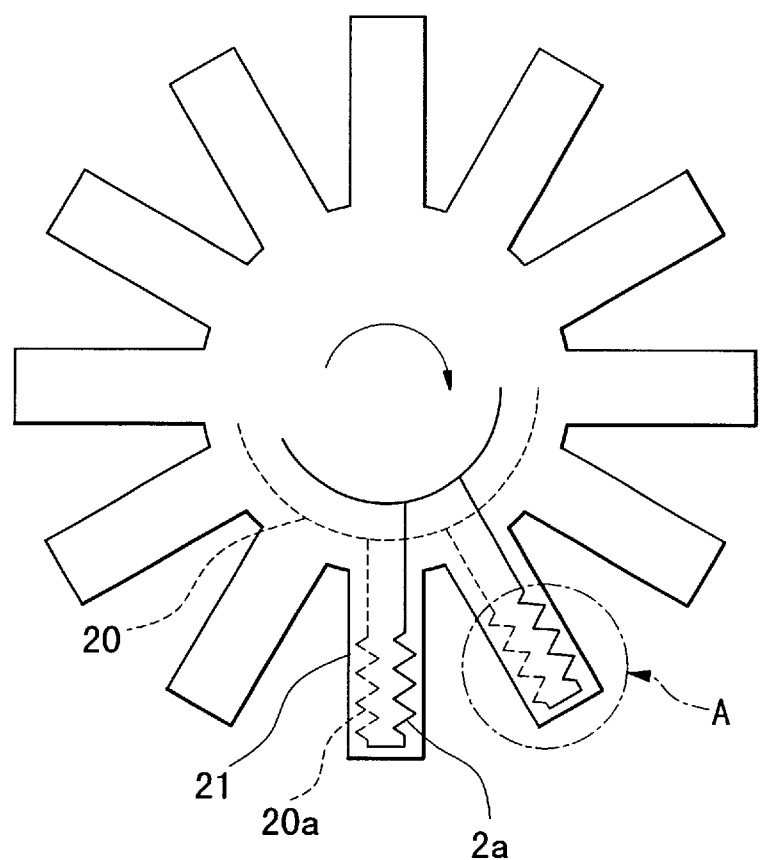
FIG. 2 is a schematic diagram showing the steam cooling system of moving blade parts of the gas turbine.
Figure 3:
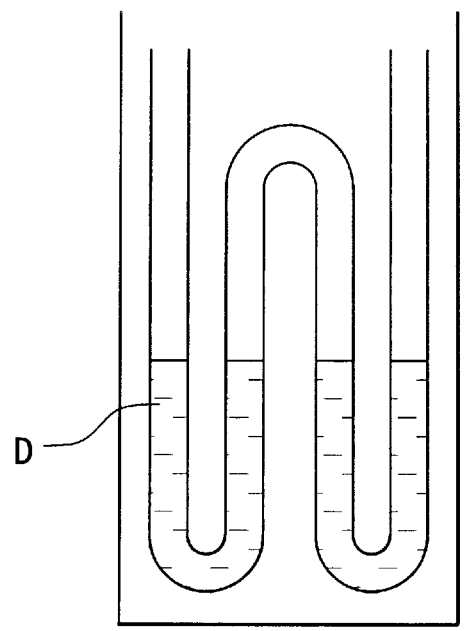
FIG. 3 is an enlarged diagram showing the portion "A" of FIG. 2.

FIG. 2 schematically shows the high temperature cooled parts 1b of the moving blade of the gas turbine. A cooling steam going pipe 2a which is drawn by a solid line, for supplying the cooling steam from the steam supply pipe 2, and a cooling steam turning pipe 20a which is drawn by a dotted line, for returning the cooling steam to a steam return pipe 20, are disposed in a blade 21. Meantime, FIG. 3 shows the drainage D stored in the tip of the blade 21.

In this embodiment with the construction as described above, the switching valve 10a is closed and the switching valve 9a is opened when starting the gas turbine, then, the auxiliary steam supply pipe 9 is connected the steam supply pipe 2, and steam is supplied to the high temperature cooled parts 1.

Therefore, the air remained in the system is purged by this supplied steam and the drainage produced in the system is also purged via drainage exhaust lines 14, 15, and 16. Furthermore, drain valves 11, 12, and 13 are closed properly according to the timing when the warming process of this system is finished.

With the further supply of the steam, the warming process of the high temperature cooled parts 1 progresses gradually, and for the meantime, the flow-meters 3a, 3b and the thermometers 4a, 4b are continuously operated through the warming process. In the flow-meters 3a, 3b, the first subtraction device 5 outputs the value $F_{in}-F_{out}$ based on the measured value $F_{in}$ by the inlet flow-meter 3a and the measured value $F_{out}$ by the outlet flow-meter 3b. This value $F_{in}-F_{out}$ is compared with a predetermined value (permissible value) at the first comparison device 6, and if $F_{in}-F_{out} \leq$ permissible value is achieved, the first comparison device 6 considers that the warming process is finished and outputs a warming process finishing command A.

Meantime, in the thermometers 4a, 4b, the second subtraction device 7 outputs the value $T_{in}-T_{out}$ based on the measured value $T_{in}$ by the inlet thermometer 4a and the measured value $T_{out}$ by the outlet thermometer 4b. This value $T_{in}-T_{out}$ is compared with a predetermined value (permissible value) at the second comparison device 8, and if $T_{in}-T_{out} \leq$ permissible value is achieved, the second comparison device 8 considers that the warming process is finished and outputs a warming process finishing command B, similarly to the case of the flow-meters.

Furthermore, the measured value $T_{out}$ of the outlet thermometer 4b is compared from the saturated temperature at the supplied steam pressure, and as the result, the relation of both temperatures is compared with a predetermined permissible value. And if $T_{out}$-saturated temperature $\geq$ permissible value is achieved, a warming process finishing command C is output, similarly to the cases of the flow-meters and the thermometers. However, this step is not shown in the Figures.

The warming process may be considered to be finished when the all or two of the above warming process finishing commands A, B, C are output, and the combination of the above commands may be decided in compliance with the scale or the required accuracy of the plant.

If the high temperature cooled parts 1 of the gas turbine is a movable portion, namely the high temperature cooled parts 1b of moving blades of the turbine, it is preferable that the step to certainly exhaust the drainage in the blade tip with a (low speed) turning, is provided. This drainage exhaust step must be carefully performed because the drainage remained at the blade tip portion of the turbine may promotes excessive centrifugal force or unbalance or the like which may cause accidents.

It is possible to embed a thermocouple at a local position which tends to remain the drainage by reason of its structure. In this case, the decision to finish the warming process is performed based on the measurement of the thermocouple.

Note that the present invention is not limited to the embodiments explained here, but rather, includes variations and modifications thereon, provided these do not depart from the spirit of the invention.

INDUSTRIAL APPLICABILITY OF THE INVENTION

As described above, in the present invention, the air remained in the steam cooling system is purged and the drainage produced in this process is exhausted at the start of the gas turbine. Furthermore, the stage at which the warm-up of the steam cooling system is finished and the following series of operations can be smoothly progressed, can be certainly detected by the difference of the flow of the cooling steam at the gateway of the steam cooling system. Therefore, stability and safety during operation can be significantly improved.

Furthermore, in the invention which is disclosed in claim 2, the finish of the warm-up process can be certainly detected by the difference of the temperature of the cooling steam at the gateway of the steam cooling system. Therefore, the stability and the safety during operation can be significantly improved, similarly to the above described case.

What is claimed:

1. A combined cycle power plant comprising:
   a gas turbine;
   a steam turbine driven by steam generated by exhaust heat from said gas turbine;
   a gas turbine cooling system having a steam inlet, a steam flow passage in high temperature parts of said gas turbine for cooling the high temperature parts with steam from said inlet, and a steam outlet of superheated steam from said steam cooling system;
   a first steam flow rate detector positioned in said steam cooling system at an upstream side of said high temperature parts in a direction of steam flow;
   a second steam flow rate detector positioned in said steam cooling system at a downstream side of said high temperature parts in the direction of steam flow;
   a comparator which compares flow rates detected by said first and second flow rate detectors; and
   means for issuing an output command when a difference in the flow rates detected by said first and second flow rate detectors is not greater than a predetermined value.

2. The combined cycle power plant of claim 1, wherein the high temperature parts of said gas turbine are rotating blades.

3. A combined cycle power plant comprising:
   a gas turbine;
   a steam turbine driven by steam generated by exhaust heat from said gas turbine;
   a gas turbine cooling system having a steam inlet, a steam flow passage in high temperature parts of said gas turbine for cooling the high temperature parts with steam from said inlet, and a steam outlet of superheated steam from said steam cooling system;
   a first steam temperature detector positioned in said steam cooling system at an upstream side of said high temperature parts in a direction of steam flow;
   a second steam temperature detector positioned in said steam cooling system at a downstream side of said high temperature parts in the direction of steam flow;
   a comparator which compares temperatures detected by said first and second temperature detectors; and
   means for issuing an output command when a difference in the temperatures detected by said first and second temperature detectors is not greater than a predetermined value.

4. The combined cycle power plant of claim 3, wherein the high temperature parts of said gas turbine are rotating blades.

5. A combined cycle power plant comprising:
   a gas turbine;
   a steam turbine driven by steam generated by exhaust heat from said gas turbine;
   a gas turbine cooling system having a steam inlet connected to a steam flow passage in high temperature parts of said gas turbine for cooling the high temperature parts with steam from said inlet, and a steam outlet connected to return superheated steam from said steam cooling system to said steam turbine;
   a steam temperature detector positioned in said steam cooling system at a downstream side of said high temperature parts in the direction of steam flow; and
   a comparator which compares the temperature detected by said temperature detector with a saturated temperature of steam in said steam cooling system at an upstream side of said high temperature parts in the direction of stream flow.

6. The combined cycle power plant of claim 5, further comprising means for issuing an output command when a difference between the temperature detected by said temperature detector and the saturated temperature is not less than a predetermined value.

7. The combined cycle power plant of claim 5, wherein the high temperature parts of said gas turbine are rotating blades.

8. A combined cycle power plant comprising:
   a gas turbine;
   a steam turbine driven by steam generated by exhaust heat from said gas turbine;
   a gas turbine cooling system having a steam inlet, a steam flow passage in high temperature parts of said gas turbine for cooling the high temperature parts with steam from said inlet, and a steam outlet of superheated steam from said steam cooling system;
   a first steam flow rate detector positioned in said steam cooling system at an upstream side of said high temperature parts in a direction of steam flow;
   a second steam flow rate detector positioned in said steam cooling system at a downstream side of said high temperature parts in the direction of steam flow;
   a first steam temperature detector positioned in said steam cooling system at an upstream side of said high temperature parts in a direction of steam flow;
   a second steam temperature detector positioned in said steam cooling system at a downstream side of said high temperature parts in the direction of steam flow;
   a flow rate comparator which compares flow rates detected by said first and second flow rate detectors;
   a temperature comparator which compares temperatures detected by said first and second temperature detectors; and
   means for issuing an output command when the flow rate comparator and the temperature comparator determine the presence of at least two of the following three conditions: (1) a difference in the flow rates detected by said first and second flow rate detectors is not greater than a predetermined value; (2) a difference in the temperatures detected by said first and second temperature detectors is not greater than a predetermined value; (3) a difference between the temperature detected by said temperature detector and the saturated temperature of steam in said steam cooling system at an upstream side of said high temperature parts is not less than a predetermined value.

9. The combined cycle power plant of claim 8, wherein the high temperature parts of said gas turbine are rotating blades.

10. A combined cycle power plant comprising:
    a gas turbine;
    a steam turbine driven by steam generated by exhaust beat from said gas turbine;
    a gas turbine cooling system having a steam inlet connected to a steam flow passage in high temperature parts of said gas turbine for cooling the high temperature parts with steam from said inlet, and a steam outlet connected to return superheated steam from said steam cooling system to said steam turbine;

a first steam flow rate detector positioned in said steam cooling system at an upstream side of said high temperature parts in a direction of steam flow;

a second steam flow rate detector positioned in said steam cooling system at a downstream side of said high temperature parts in the direction of steam flow; and means for determining that a warm-up process of the gas turbine is completed when a difference in the flow rates detected by said first and second flow rate detectors is not greater than a predetermined value.

11. A combined cycle power plant comprising:

a gas turbine;

a steam turbine driven by steam generated by exhaust heat from said gas turbine;

a gas turbine cooling system having a steam inlet connected to a steam flow passage in high temperature parts of said gas turbine for cooling the high temperature parts with steam from said inlet, and a steam outlet connected to return superheated steam from said steam cooling system to said steam turbine;

a first temperature detector positioned in said steam cooling system at an upstream side of said high temperature parts in a direction of steam flow;

a second steam temperature detector positioned in said steam cooling system at a downstream side of said high temperature parts in the direction of steam flow; and means for determining that a warn-up process of the gas turbine is completed when a difference in the temperatures detected by said first and second temperature detectors is not greater than a predetermined value.

12. A combined cycle power plant comprising:

a gas turbine;

a steam turbine driven by steam generated by exhaust heat from said gas turbine;

a gas turbine cooling system having a steam inlet connected to a steam flow passage in high temperature parts of said gas turbine for cooling the high temperature parts with steam from said inlet, and a steam outlet connected to return superheated steam from said steam cooling system to said steam turbine;

a steam temperature detector positioned in said steam cooling system at a downstream side of said high temperature parts in the direction of steam flow; and means for determining that a warm-up process of the gas turbine is completed when a difference between the temperature detected by said temperature detector and the saturated temperature is not less than a predetermined value.

13. A combined cycle power plant comprising:

a gas turbine;

a steam turbine driven by steam generated by exhaust heat from said gas turbine;

a gas turbine cooling system having a steam inlet connected to a steam flow passage in high temperature parts of said gas turbine for cooling the high temperature parts with steam from said inlet, and a steam outlet connected to ret superheated steam from said steam cooling system to said steam turbine;

a first steam flow rate detector positioned in said steam cooling system at an upstream side of said high temperature parts in a direction of steam flow;

a second steam flow rate detector positioned in said steam cooling system at a downstream side of said high temperature parts in the direction of steam flow;

a first steam temperature detector positioned in said steam cooling system at an upstream side of said high temperature parts in a direction of steam flow;

a second steam temperature detector positioned in said steam cooling system at a downstream side of said high temperature parts in the direction of steam flow; and means for determining that a warm-up process of the gas turbine is completed in the presence of at least two of the following three conditions: (1) a difference in the flow rates detected by said first and second flow rate detectors is not greater than a predetermined value; (2) a difference in the temperatures detected by said first and second temperature detectors is not greater than a predetermined value; (3) a difference between the temperature detected by said second temperature detector and a saturated temperature of steam in said steam cooling system at an upstream side of said high temperature pans is not less than a predetermined value.

* * * * *